No. 611,418. Patented Sept. 27, 1898.
W. A. RUSSELL.
WALL, FLOOR, OR CEILING PLATE.
(Application filed May 13, 1897.)
(No Model.)
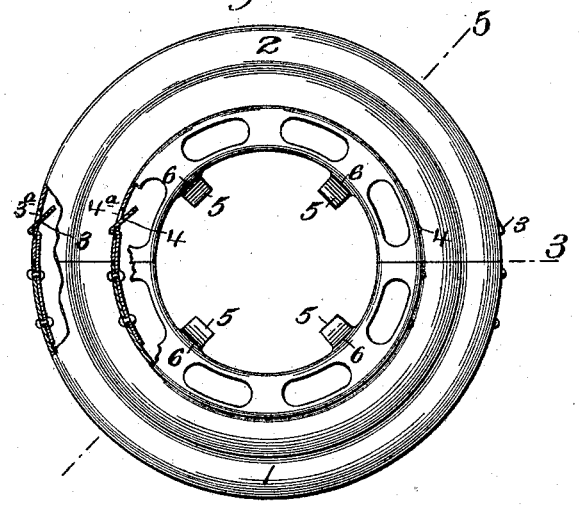
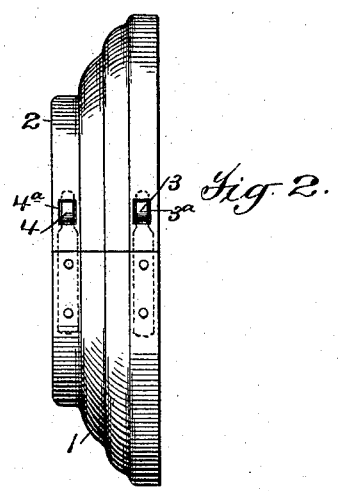
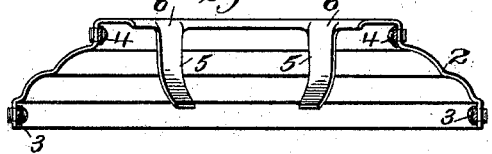
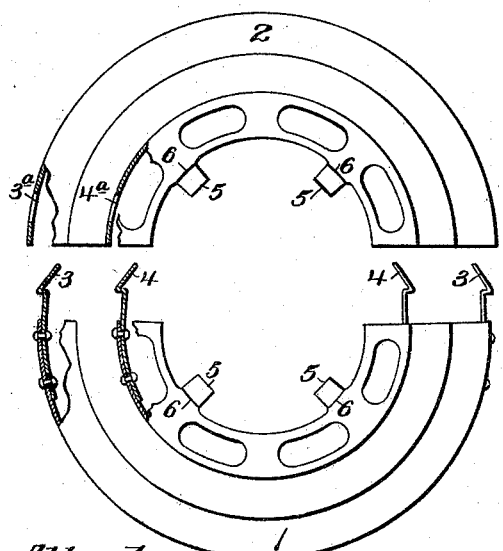
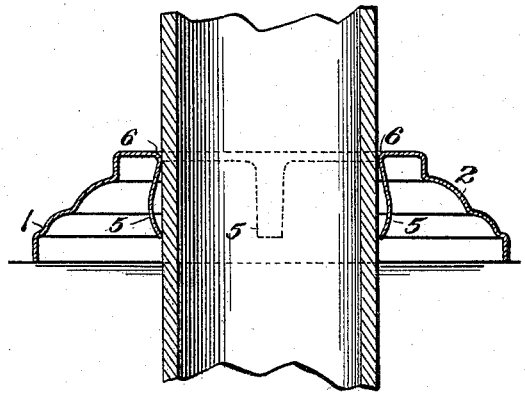
Attest:
J. V. Bourke
J. A. Graves
Inventor:
William A. Russell
By Philipp Phelps Sawyer
Attys
THE NORRIS PETERS CO., PHOTO-LITHO., WASHINGTON, D. C.

UNITED STATES PATENT OFFICE.

WILLIAM A. RUSSELL, OF NEW YORK, N. Y.

WALL, FLOOR, OR CEILING PLATE.

SPECIFICATION forming part of Letters Patent No. 611,418, dated September 27, 1898.

Application filed May 13, 1897. Serial No. 636,322. (No model.)

*To all whom it may concern:*

Be it known that I, WILLIAM A. RUSSELL, a citizen of the United States, residing at New York, (New Brighton,) county of Richmond, and State of New York, have invented certain new and useful Improvements in Wall, Floor, and Ceiling Plates, fully described and represented in the following specification and the accompanying drawings, forming a part of the same.

My invention relates to a wall, floor, or ceiling plate for pipes, consisting of separable sections adapted to be brought together to embrace the pipe and provided with locking devices for locking the sections together when thus brought together about the pipe. Such plates are in some cases termed "canopies" or "escutcheons;" but for convenience they will be hereinafter termed "plates."

It is the object of the present invention to simplify the construction and cheapen the cost of producing such plates and to provide a plate of this character which while embodying these advantages will also be of such construction that the separable sections may be more readily and quickly brought together into position about the pipe, will be held or locked more securely against displacement with relation to each other, and will so engage the pipe that the plate as a whole will be held more securely against any tendency toward displacement longitudinally of the pipe to which it may be applied than in plates of this character heretofore devised.

As a full understanding of the invention can best be had by an illustration and a detailed description of an organization embodying the same, such description will now be given, in connection with the accompanying drawings, illustrating the invention in its preferred form, and in which—

Figure 1 is a plan view of a plate embodying the present invention, the two separable sections thereof being brought together and locked. Fig. 2 is a side view of the same. Fig. 3 is a section on the line 3 of Fig. 1. Fig. 4 is a plan view, partly in section, of the two sections of the plate disconnected; and Fig. 5 is a section on the line 5 of Fig. 1, showing the plate applied to a pipe.

Referring to said drawings, 1 2 represent the two sections of the plate, which are counterparts of each other and which when brought together form an annular plate contracted at one end to approximately the diameter of a pipe or the like and enlarged at the opposite end or what may be termed the "base," so that when in position upon a pipe or the like such end will bear or rest against the surface of the wall or the like through which the pipe or the like passes, the plate as a whole being somewhat conical in general appearance. The two ends of section 1 are each provided with a pair of spring-catches 3 4, which with corresponding openings $3^a$ $4^a$, respectively, in the ends of section 2 form a locking device for locking the two sections together with the ends of both in contact, as shown in Figs. 1 and 2. The catches 3 in the ends of section 1 and their corresponding openings $3^a$ in section 2, it will be observed, are located in the base or end portions of their respective sections, while the catches 4 and their corresponding openings $4^a$ are located in the contracted ends or what may be called the "neck" portions of their respective sections. The advantage of thus locking the plates together at two points longitudinally resides in the fact that by so locking them all liability of the plates rocking one upon the other, and thus working loose, is avoided, whereas if the sections of such plates be locked at but one point at each meeting edge the two sections are more or less free to rock to and from each other on the locking devices as a fulcrum, and thus under certain conditions work loose, so as to separate the edges of their meeting ends.

The spring-catches 3 4 are riveted or otherwise secured to the inner face of section 1 and project beyond the ends of said section, (see Fig. 4,) so as to be overlapped by the ends of section 2. They are formed of spring metal, so as to readily yield laterally as the two sections are brought together and spring outwardly when their hooked ends coincide with the openings $3^a$ $4^a$, and thus lock the sections together, the catches 3 4 and openings $3^a$ $4^a$ thus forming self-locking devices.

The sections 1 2 are formed of resilient sheet metal sufficiently thin to permit the two ends of section 1 to be pressed toward each other by hand in separating or in bringing together the two sections, so that the hooked ends of the catches 3 4 and the ends of section 2 may conveniently pass each other. As they pass in bringing together the two sections the pressure is removed from the ends of section 1, which are thus free to expand. As a result of this construction the locking devices are held in engagement, not merely by their own resiliency, but by that also of the section or sections of the plate. Each section is also provided with a pair of arms 5, integral therewith and projecting longitudinally thereof. The arms 5 are bent outwardly, so as to form shoulders 6 at the neck of the plate for contact with the pipe, and then bent inwardly, so as to again contact at their free ends with the pipe at about the base of the plate in line with the shoulders 6. The free ends of the arms 5, it will be observed, project inwardly somewhat beyond the shoulders 6. Four such arms, two in each section, are preferably employed, which in the completed plate are equidistant from each other and engage the pipe at points opposite each other, so as to frictionally lock the plate thereto. The advantages of this construction and arrangement of arms are obvious. They each provide for yielding contact at two points longitudinally of the pipe and in line with the locking devices of the sections of the plate, and thus not only securely lock the plate thereto against movement rotarily or longitudinally of the pipe, but also aid in retaining the two sections of the plate in proper relationship to each other.

What I claim is—

1. A plate of the class described contracted at one end to embrace a pipe or the like and enlarged at its opposite end to engage the surface of a wall or the like, said plate comprising two separable sections one pair of meeting ends whereof is provided with self-locking devices comprising two catches located at different points longitudinally of the plate on one section and projecting beyond the edge thereof and two similarly-located members on the other section adapted to interlock with said catches as the meeting ends are brought together, the other pair of meeting ends being provided with suitable connecting means and one of said sections being laterally resilient whereby the sections may be locked or unlocked, substantially as described.

2. A plate of the class described contracted at one end to embrace a pipe or the like and enlarged at its opposite end to engage the surface of a wall or the like, said plate comprising two separable sections one pair of meeting ends whereof is provided with self-locking devices comprising two laterally-yielding spring-catches located at different points longitudinally of the plate on one section and projecting beyond the edge thereof into position to be embraced by the other section and two similarly-located members on the latter section adapted to interlock with the catches as the meeting ends are brought together, the other pair of meeting ends being provided with suitable connecting means, and the catch-bearing section being laterally resilient, whereby the sections may be locked or unlocked, substantially as described.

3. A plate of the class described contracted at one end to embrace a pipe or the like and enlarged at its opposite end to engage the surface of a wall or the like, said plate comprising two separable sections, one of said sections being provided at each end with a pair of catches projecting beyond the edge thereof into position to be embraced by the other section, and the latter section provided at each end with a pair of similarly-located members adapted to interlock with the catches as the two sections are brought together, said catch-bearing section being laterally resilient, whereby the sections may be locked or unlocked, substantially as described.

4. A plate of the class described having a broadened base and of decreasing width vertically and comprising two separable sections, one of said sections being provided at each end with a pair of spring-catches having outward locking projections and the other section provided at each end with a pair of corresponding openings adapted to interlock with said projections as the sections are brought together, said catch-bearing section being laterally resilient whereby the sections may be locked or unlocked, substantially as described.

In testimony whereof I have hereunto set my hand in the presence of two subscribing witnesses.

WILLIAM A. RUSSELL.

Witnesses:
J. J. KENNED,
A. L. KENT.